(12) United States Patent  
Klement (10) Patent No.: US 7,707,910 B2
(45) Date of Patent: May 4, 2010

(54) GEARBOX MODULE

(75) Inventor: Werner Klement, Heidenheim (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 764 days.

(21) Appl. No.: 10/572,350

(22) PCT Filed: Sep. 2, 2004

(86) PCT No.: PCT/EP2004/009765

§ 371 (c)(1),
(2), (4) Date: Nov. 27, 2006

(87) PCT Pub. No.: WO2005/040640

PCT Pub. Date: May 6, 2005

(65) Prior Publication Data

US 2007/0193382 A1    Aug. 23, 2007

(30) Foreign Application Priority Data

Sep. 19, 2003   (DE) ............................ 103 43 972

(51) Int. Cl.
*F16H 47/00*    (2006.01)
(52) U.S. Cl. ................ 74/730.1; 74/329; 74/331
(58) Field of Classification Search ............ 74/325, 74/329, 330, 331, 730.1
See application file for complete search history.

(56) References Cited

U.S. PATENT DOCUMENTS

| | | | | |
|---|---|---|---|---|
| 2,772,581 A | 12/1956 | Maier et al. | | 74/732 |
| 4,375,171 A * | 3/1983 | Morscheck | | 74/331 |
| 4,966,048 A | 10/1990 | Braun | | 74/745 |
| 5,823,051 A | 10/1998 | Hall, III | | 74/325 |
| 6,186,029 B1 | 2/2001 | McQuinn | | 74/718 |
| 6,860,168 B1 * | 3/2005 | Kobayashi | | 74/331 |
| 7,070,534 B2 * | 7/2006 | Pelouch | | 475/214 |
| 7,263,907 B2 * | 9/2007 | Stevenson | | 74/340 |

FOREIGN PATENT DOCUMENTS

| | | |
|---|---|---|
| DE | 1650762 | 2/1971 |
| DE | 37 00 380 A1 | 8/1987 |
| DE | 41 04 170 A1 | 8/1992 |
| DE | 198 40 284 A1 | 8/1999 |

(Continued)

OTHER PUBLICATIONS

International Search Report dated Dec. 16, 2004 from PCT/EP2004/009765.

*Primary Examiner*—David D Le
(74) *Attorney, Agent, or Firm*—Ohlandt, Greeley, Ruggiero & Perle, L.L.P (57) ABSTRACT

A gearbox module having a gearbox input and at least one gearbox output; having a starting element coupled to the gearbox input, having an input and an output that can be coupled at least indirectly to the gearbox output; having a gear-shifting device, having at least two inputs and one output, which can be connected to the gearbox output; a first input of the gear-shifting device is connected to the output of the starting element and a second input is connected to the input of the starting element; each input of the gear-shifting device is selectively connected by means of a synchronously shiftable coupling, thereby producing a first power branch and a second power branch.

22 Claims, 9 Drawing Sheets

FOREIGN PATENT DOCUMENTS

| | | |
|---|---|---|
| DE | 198 40 287 A1 | 9/1999 |
| DE | 199 24 501 A1 | 12/2000 |
| DE | 199 60 621 A1 | 6/2001 |
| DE | 102 28 636 A1 | 4/2003 |
| EP | 1 302 697 A2 | 4/2003 |
| FR | 1445735 | 6/1966 |
| GB | 1035386 | 7/1966 |
| JP | 60057033 A | 4/1985 |

* cited by examiner

GEARBOX MODULE

RELATED APPLICATIONS

This application claims priority in PCT International Application No. PCT/EP2004/009765, filed Sep. 2, 2004, and German Application No. DE 103 43 972.2, filed on Sep. 19, 2003, the disclosures of which are incorporated herein by reference.

The invention relates to a gearbox module, particularly to an automatic gearbox, with the features in detail taken from the preamble of claim 1.

Gearbox modules, in particular automatic gearboxes, are known from the prior art in a plurality of the most diverse designs. In the simplest case, they comprise a starting element, a lockup clutch associated with it, and an rpm/torque converting unit, which is characterized by at least one gear step, and is arranged downstream of the starting element and the lockup clutch. Common to all gearbox modules here is the fact that, during the switching or gear-shifting operation, that is, particularly during a gear-step shift, no interruption of tractive power occurs. This means that the switching element of the gear step that is in gear and is to be released and the gear element of the next gear step that is to be closed, that is, engaged, still transmit at least a portion of the power supplied by the drive engine to each other in an overlapping manner. To this end, the switching elements are operated with slip, for which reason, here, as a rule, only force-activated switching elements, particularly those transmitting via frictional engagement, are employed. However, this has the drawback that, on the one hand, power losses are registered, because the operating mode of the individual switching elements is subject to slip during power transmission between the gearbox input and the gearbox output, for which reason the efficiency of the entire assembly is low, and, on the other hand, the individual switching elements are subject to wear and therefore give rise to short maintenance intervals for the entire assembly. If synchronously shiftable couplings are employed, the switching or gear shifting always occurs with an interruption in tractive power.

The invention is based on the problem of further developing a gearbox module of the kind mentioned above in such a way that the mentioned drawbacks are avoided. In particular, transmission elements in the power flow that are subject to wear are to be dispensed with.

The solution in accordance with the invention is characterized by the features of claim 1. Advantageous embodiments are presented in the subclaims.

In accordance with the invention, the greater part of the power flow, preferably the entire power flow, is transmitted not via switching elements that work in a force-activated manner, but rather via synchronously shiftable couplings, which avoid a slip operation between the elements in the power transmission pathway that are to be connected to one another. To this end, the gearbox module comprises at least one gearbox input and one gearbox output. Provided between these is a starting element as well as a gear-shifting device associated with the starting element. Said device assumes, in addition to the lockup function for the starting element, also the maintenance of the tractive power during gear shifting. Also provided are rpm/torque converting devices, preferably at least one said device that is coupled either to the starting element or to the gear-shifting device or to both jointly. The starting element itself has at least one input, which is connected to the gearbox input in a rotationally fixed manner, and one output, which can be connected to the gearbox output at least indirectly in a rotationally fixed manner, this connection being produced in part solely via the gear-shifting device. To this end, the gear-shifting device comprises at least two inputs, a first input, which is connected to the output of the starting element in a rotationally fixed manner, and a second input, which is connected to the input of the starting element in a rotationally fixed manner, this connection being free of any rotationally fixed coupling to the output of the starting element. Thereby provided is at least one output that is connected to the gearbox output. Here, each input of the gear-shifting device can be selectively connected via a synchronously shiftable coupling to the output of the gear-shifting device, thereby producing two power branches, a first power branch and a second power branch. The synchronously shiftable couplings in accordance with the invention can then be actuated either jointly in the sense of producing a rotationally fixed connection between the respective input and the output or else respectively alone. This makes it possible, on the one hand, to conduct the power transmission by way of two power branches, whereby the power transmission in the first branch occurs via the starting element, whereas a purely mechanical power transmission is conducted in the second power branch by having the gearbox input connected to the output of the gear-shifting device in a rotationally fixed manner, bypassing the starting element. On the other hand, the power via the two branches can be transmitted in a parallel manner, the gear-shifting device functioning as a summing gearbox in this case and the two power branches being combined once again at the output of the gear-shifting device.

A plurality of possibilities are conceivable in terms of the concrete structural arrangement of the connections of the inputs to the output of the gear-shifting device. In the simplest case, a back-gear design is resorted to. Here, however, two basic configurations, which are characterized by the directing of the power flow are fundamentally distinguished. These involve a) the power transmission in power branches that are parallel to each other, but eccentric to the starting element and b) the power transmission in power branches that are arranged coaxially to each other, but at least partially parallel to the starting element.

The second variant is characterized here by an especially high degree of compactness of the entire gearbox. The required space can be kept to a minimum or, in comparison to the solution proposed according to a), the space that is freed up can be used for the arrangement of other functional elements.

The basic configuration, in accordance with the invention, of starting element, gear-shifting device, and rpm/torque converting device makes possible, in addition to the operation as a gearbox module in the form of an automatic gearbox, also the operating mode as an automatic transmission, for which no changes and modifications whatsoever are required, it being necessary only to change the drive control, because, in this case, a separation between the motor and the gearbox always occurs during the gear-shifting operation. This change in the drive control involves the elimination of power transmission via the first power pathway during the gear-shifting operation; that is, no power transmission occurs via the starting element.

As already discussed, in the simplest case, the structural configuration is provided in a back-gear design. In this case, each power branch has at least one first back gear, which is connected to the output of the starting element or to the input of the starting element in a rotationally fixed manner and is connected again to the output of the gear-shifting device via an additional back gear that can be coupled to the back-gear shaft arranged parallel to the starting element, particularly to the axis of rotation of the starting element. Preferably, here, the synchronously shiftable coupling is arranged in each case between the back gear that is connected to the output of the gear-shifting device in a rotationally fixed manner and the back-gear shaft.

According to the second solution approach, which is marked by a high degree of compactness, the individual back gears are arranged in the axial direction parallel to one another and coaxially to one another, with one of the two back-gear shafts being designed as a hollow shaft, through which the other respective back-gear shaft of the other power branch is passed.

The gear-shifting device itself can already characterize one gear step and thus forms a part of the rpm/torque converting device or else parts of the rpm/torque converting device are used jointly by it and by the gear-shifting device. To this end, according to an especially advantageous embodiment, the rpm/torque converting device arranged downstream of the gear-shifting device is also constructed in a back-gear design, so that, here, the back-gear shaft of the second power branch can be used as well. The required space can be kept very small in this way. Furthermore, the lockup function can also be integrated directly into the gearbox in this way, so that the output of the gear-shifting device is formed at any point in the gearbox in this case.

As already discussed, the gearbox designed in accordance with the invention is free of any frictionally engaged power transmission, so that transmission elements subject to wear are dispensed with to the greatest extent possible. The synchronously shiftable couplings are designed here preferably as positive locking clutches, in particular as claw clutches.

There exist no limitations in terms of the concrete design of the starting elements. The choice is made according to the requirements of the applied case. Conceivable are hydrodynamic components—for example, hydrodynamic clutches or converters, power-source generating units, as well as hydrostatic or else mechanical solutions (wet or dry multidisk clutches). Preferably, on account of the advantageous properties in the main range of use of the starting element, hydrodynamic solutions are chosen. The gearbox module of the invention accordingly comprises only one transmission element, in the form of the starting element, that is subject to slip. In all other gear steps, the power transmission occurs in a purely mechanically manner, free of slip. In order to produce the lockup of the hydrodynamic element and a gear step, accordingly, only a single clutch is required and not several clutches that have to be engaged at the same time.

The solution in accordance with the invention is illustrated below on the basis of figures. Shown therein in detail are the following.

Figure 1:
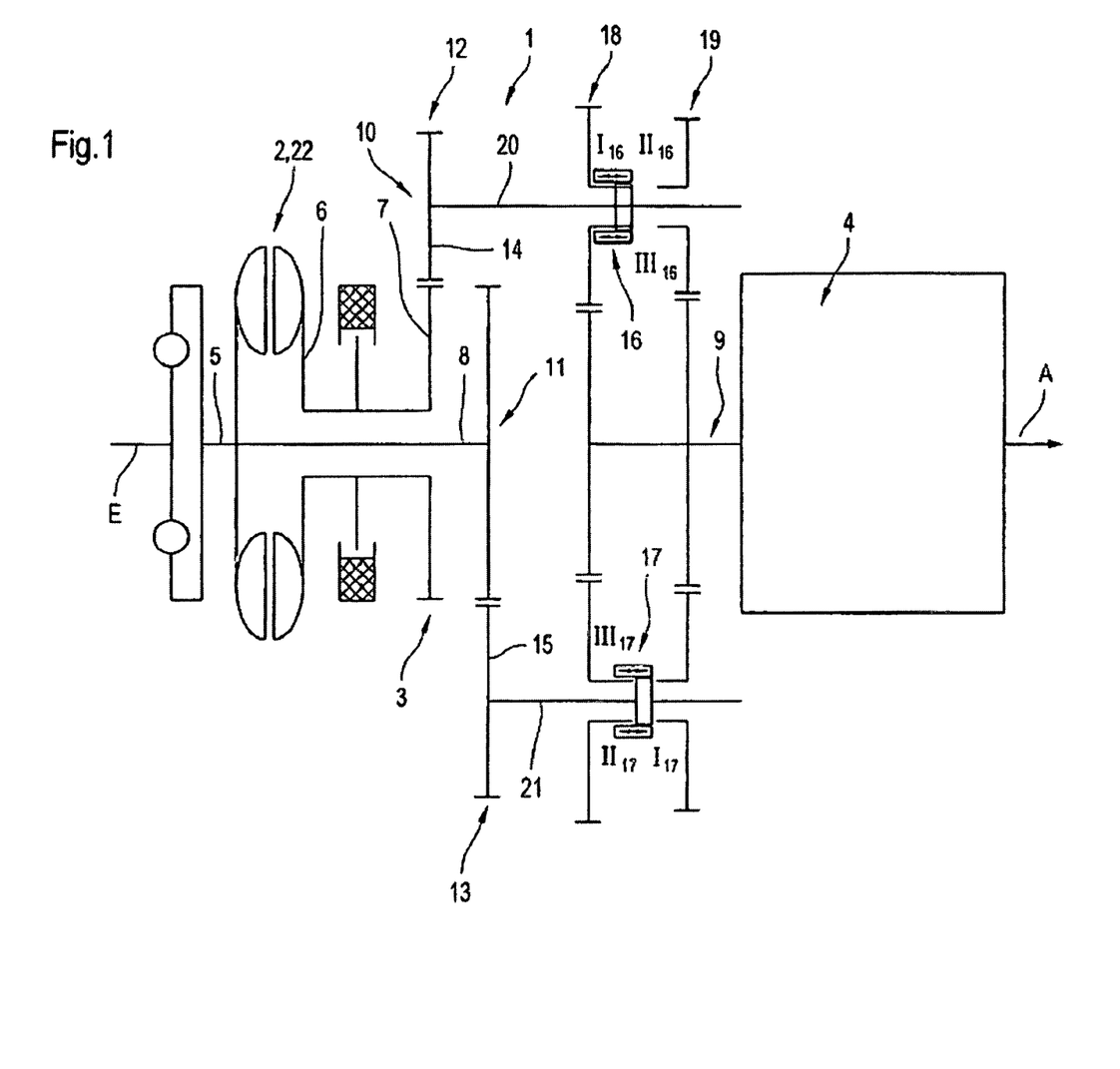
FIG. 1 illustrates, in a schematically simplified depiction, the basic construction of a gearbox module designed in accordance with the invention, which can also be used as an automatic transmission by changing the drive control.

FIG. 1 illustrates, in a schematically simplified depiction, the basic construction and the basic principle of a gearbox module designed in accordance with the invention, in particular an automatic gearbox. Said gearbox module comprises at least one gearbox input E and one gearbox output A. Between the gearbox input E and the gearbox output A are a starting element 2 and a device that is associated with it for gear shifting, particularly for lockup of the starting element and maintenance of tractive power during the gear-step change. Such a gearbox module 1 further comprises at least one rpm/torque converting device 4, preferably in the form of so-called gearshift steps. The starting element 2 and the lockup clutch for bypassing the power flow at the starting element 2 are here each connected to the gearbox input E and further, at least indirectly, to the gearbox output A. To this end, the starting element 2 has an input 5, which is connected to the gearbox input E or which constitutes it. The starting element 2 has, in addition, an output 6, which is connected at least indirectly to the gearbox output A. "At least indirectly" means that, as a rule, additional rpm/torque transmitting devices and/or converting devices are disposed in between. This applies by analogy to the gear-shifting device. The latter is connected at least indirectly to the gearbox input E, preferably via the input 5 of the starting element 2. Furthermore, the gear-shifting device 3 is coupled to the output 6 of the starting element 2. These two couplings constitute the inputs 7 and 8 of the gear-shifting device 3 during power transmission in traction operation, as viewed from the gearbox input E to the gearbox output A. The gear-shifting device 3 further comprises at least one output 9. Here, the latter is connected to the gearbox output A at least indirectly in a rotationally fixed manner. The coupling to the gearbox output A occurs via at least one rpm/torque converting device 4. The starting element 2 is also connected via the gear-shifting device 3 to the rpm/torque converting device 4. The starting element 2 and the gear-shifting device 3 can be designed here as separate modular units, which are coupled to each other, or else they can be combined into a single structural unit. Preferably, however, the gear-shifting device 3 is already combined with the downstream rpm/torque converting devices 4 and is merely combined with the starting element 2 to create the complete modular unit of the gearbox module 1.

On account of the linkage of the gear-shifting device 3 in an embodiment with two inputs 7 and 8, it is possible, in the interaction of the starting element 2 and the gear-shifting device 3, to produce two power branches. In the first power branch, which is designated here as 10, the power is conveyed from the gearbox input E to the gearbox output A via the starting element 2 and the gear-shifting device 3 arranged downstream of it. In the second power branch 11, the power flow is conveyed to the gearbox output A via the gear-shifting device 3 so as to bypass the starting element 2. Here, the two power branches can be switched separately or else in parallel. The first power branch 10 is characterized here in terms of design by the coupling between the gearbox input E and the input 7 of the gear-shifting device 3 with the output A via the starting element 2 and the gear-shifting device 3. The second power branch 11 is characterized here by the coupling between the gearbox input E and gear-shifting device 3 with the gearbox output A.

The two power branches 10 and 11 can be activated in accordance with the invention via synchronously shiftable couplings 16 and 17, which are arranged respectively alone or else in parallel in each power branch 10 and 11 and which can be selectively actuated. The synchronously shiftable couplings 16 and 17 serve here for the at least indirect connection, that is, the rotationally fixed connection that can be produced either [directly][1] or via additional transmission elements, between the individual inputs 7, 8 of the gear-shifting device 3 and the output 9 of the latter. The power flow occurs in the individual branches 10, 11 at least in part parallel to the axis of rotation of the starting element 2.

[1][Translator's Note] The word in brackets is missing and is a presumed typographical error.

In order to produce the power distribution here, the gear-shifting device 3 has at least two back gears, a first back gear 12 and a second back gear 13; the first back gear 12 is connected to the output 6 of the starting element 2, whereas the second back gear 13 is connected to the gearbox input E or to the input 5 of the starting element 2, coupled to it in a rotationally fixed manner, in the power flow direction upstream of the output 6 of the starting element 2. Here, the outputs 14 and 15, respectively, of each of the two back gears—the first back gear 12 and the second back gear 13—can each be connected via the synchronously shiftable coupling 16 or 17, respectively, at least indirectly to the output 9 of the gear-shifting device 3 and thus to the gearbox output A in a rotationally fixed manner. The coupling occurs here preferably via an additional back gear 18 or 19, respectively, which is arranged coaxially to the respective back gear, in particular to the first back gear 12 and the second back gear 13. To this end, each of the outputs 14 and 15, respectively, of the back gear 12 or 13, respectively, is connected to a back-gear shaft 20 or 21, respectively, in a rotationally fixed manner and the latter, in turn, can each be coupled via the synchronously shiftable couplings 16 and 17, respectively, to the corresponding additional back gear 18 or 19, respectively. The gear-shifting device 3 accordingly has two back-gear shafts 20 and 21, which are arranged parallel to the gearbox input E and the gearbox output A, respectively, and which can be connected to the gearbox output A via the back gears 18 and 19. The gearbox input E and the gearbox output A are preferably arranged coaxially with respect to each other. However, this is not absolutely essential. The gear-shifting device 3 is produced here by means of the two synchronously shiftable couplings 16 and 17, whereby the first synchronously shiftable coupling 16 serves for the coupling of the output 6 of the starting element 2 to the gearbox output A, whereas the second shiftable coupling 17 serves for the coupling of the gearbox input E or of the input 5 of the starting element 2, which is coupled to it in a rotationally fixed manner, to the output A. The two synchronously shiftable couplings 16 and 17 are arranged parallel to each other in the design depicted in FIG. 1. In terms of their gear ratios, the individual back gears 12, 13 are preferably laid out in such a way that they produce at least a gear ratio of $\leq 1$, depending on the starting element 2 that is used. The synchronously shiftable couplings 16 and 17 are designed in accordance with the invention as positively locking clutches, the positive locking being produced preferably by way of claws. The starting element can be designed in a number of ways; preferably, hydrodynamic components 22 find use. For the basic embodiment depicted in FIG. 1, the power flow takes place, depending on the desired power transmission each time, via the first or second power branch 10 or 11, respectively, alone or else via the two power branches 10 and 11 jointly. In the first-mentioned case, which is referred as the starting operation, the power transmission occurs solely via the first power branch 10, that is, via the starting element 2. The power is transmitted here, in traction operation, as viewed from the gearbox input E to the gearbox output A, from the gearbox input E via the starting element 2, the output of the starting element 2 onto the first back gear 12 and, when the shiftable coupling 16 is actuated, onto the additional back gear 18, which is coupled to the gearbox output A at least indirectly in a rotationally fixed manner, that is, for example, via additional rpm/torque converting devices 4. In this case, the second synchronously shiftable coupling 17 is found in its switching position $II_{17}$, which describes the open state. For lockup, the second power branch 11 is activated and, in this state, the power transmission occurs at least in part via the starting element 2 and thus the first power branch 10. In this way, torque is still transmitted onto the power output shaft or onto the gearbox output A during the switching operation. This is controlled by the brief activation of the hydrodynamic component. For an upshifting operation, this takes place as follows: During driving in gear x, the power transmission occurs in a purely mechanical manner via the shiftable coupling, in particular, via a claw, through which a rigid connection between the motor and the gearbox exists. Prior to the gear-shifting operation, the hydrodynamic component is filled and then transmits a torque for a gear-shifting operation y. Once this torque has attained the magnitude of the motor torque, the claw that has been transmitting up to now, that is the switching element to be released, becomes free and is opened. Through a further increase in the filling and/or in the engagement in the motor control, the motor, that is, the drive engine, is downshifted by one step of the gearshift. Once the new rpm has been attained, the claw of the new gear, that is, the gear step to come or to be engaged, is engaged and the switching or gear shifting is ended. Here, the second synchronously shiftable coupling 17 is engaged; it is then in its switching position $I_{17}$ and connects the second back-gear shaft 21 to the additional fourth back gear 19 in a rotationally fixed manner. In this way, in accordance with the layout of the individual back gears, that of the first back gear 12 of the starting element 2 as well as the third back gear 18 and that of the second back gear 13 as well as the fourth back gear 19, a first portion of the power is transmitted via the first power pathway 10 and a second portion of the power is transmitted via the second power pathway 11. The hydrodynamic component 27 must operate with slip. Therefore, it must be ensured that, during each gear shifting, a slip is possible. When switching occurs in the operating state in which power is solely transmitted via the power branch 11, either the starting element, depending on its design, is taken out of the power flow—for example, by draining when it is designed as a hydrodynamic clutch—or else the first synchronously shiftable coupling 16 is brought into its switching position $II_{16}$, which describes the open state. The power is then transmitted between the gearbox input E and the gearbox output A solely via the second power branch 11 via the back-gear shaft 21, arranged parallel to the gearbox input shaft E, to the gearbox output A. These individual operating states are presented here in FIGS. 2a to 2g for an especially advantageous embodiment.

In contrast to this, FIGS. 2a to 2g illustrate, on the basis of a schematically simplified depiction, the basic construction and the functional operation of an especially advantageous embodiment of a gearbox module 1 designed in accordance with the invention. The basic construction corresponds in principle to that described in FIG. 1, for which reason the same reference numbers are used for the same elements. Evident is a possible embodiment of an rpm/torque converting device 4, which is characterized by an embodiment having four spur gear steps 23 to 26. This embodiment is presented here by way of example. Furthermore, the spur gear steps 23 to 26 are also designed in a back-gear construction, in which these are coupled to the second back gear 13. This results in an association of the individual gear steps with the second power branch 11, in which the power for the gear-shifting device 3 is transmitted in a purely mechanical manner. Here, by means of this embodiment, the output 9 of the gear-shifting device 3 is connected to the rpm/torque converting device 4 or to each of the individual spur gear steps 23 to 26, respectively. Further evident is an additional synchronously shiftable coupling 27, which, in terms of its spatial arrangement in the axial direction, is disposed between the gearbox input E and the gearbox output A behind the two back gears, the first back gear 12 and the second back gear 13. These back gears serve for the rigid coupling between the gearbox input E and the rpm/torque converting device 4, that is, the output 9 of the gear-shifting device 3. In this way, a so-called direct gear is produced, which creates a gear ratio of 1:1 between the gearbox input E and the gearbox output A. The solution is characterized here by an especially good efficiency, because frictional losses during the transmission of power via the power branch 10 or 11 can be avoided.

Figure 2A:
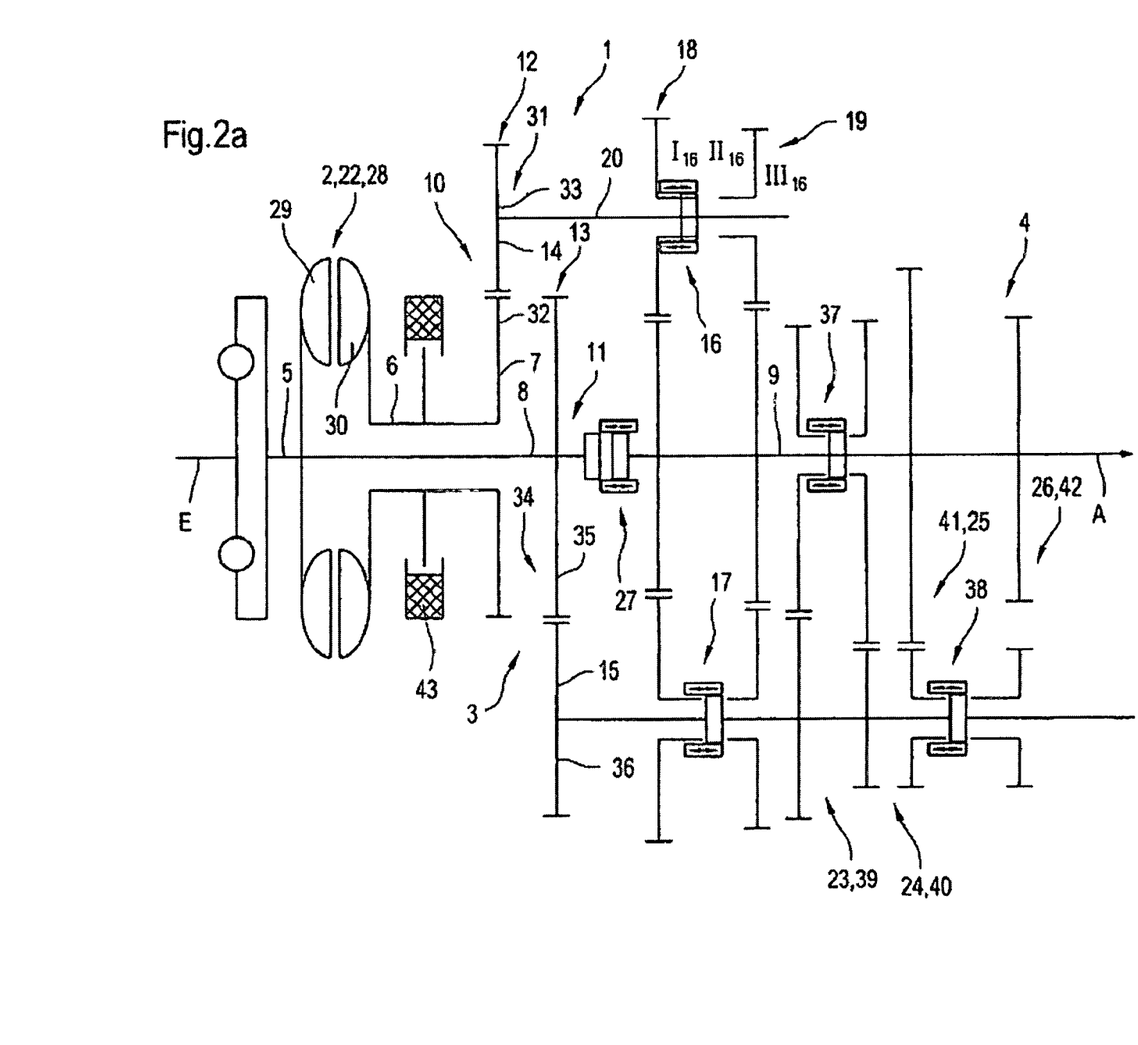
FIGS. 2a-2g illustrate, in a schematically simplified depiction based on an especially advantageous embodiment according to FIG. 1, the functional operation of the gearbox unit, designed in accordance with the invention, in the individual operating states.

The starting element 2 is constructed here as a hydrodynamic component 22, preferably as a hydrodynamic clutch 28 in the case depicted, comprising at least one primary wheel 29, which functions as a pump wheel during traction operation for power transmission as viewed from the gearbox input E to the gearbox output A, and one secondary wheel 30, which functions as a turbine wheel. Here, the primary wheel 29 is connected to the gearbox input E in a rotationally fixed manner or constitutes the latter. Furthermore, the primary wheel 29 forms the input of the starting element 2. The secondary wheel 30 forms the output 6 of the starting element 2 and can be connected via the gear-shifting device at least indirectly to the gearbox output A in a rotationally fixed manner. This means that states can be conceived in which the secondary wheel 30 is completely decoupled from the gearbox output A. In the case depicted here, the secondary wheel 30 is connected to the first back gear 12. The latter is constructed as a simple spur gear set 31, in which a first spur gear 32 of the spur gear set 31 is connected to the secondary wheel 30 in a rotationally fixed manner. This element, designed as a spur gear, meshes here with another spur gear 33, which is connected to the back-gear shaft 20 in a rotationally fixed manner or forms together with it a modular unit. The coupling of the third back gear 18 is made via the synchronously shiftable coupling 16, which takes the form of a claw clutch in the case depicted. Here, the first back gear 12 and the third back gear 18 are arranged parallel to each other and coaxially to each other. In order to produce additional gear steps, the first back gear 12 can also be coupled to the fourth back gear 19 at least indirectly in a rotationally fixed manner; this also occurs via the synchronously shiftable coupling 16. To this end, the latter has an additional switching $III_{16}$, which connects the back-gear shaft 20 to the fourth back gear 19 in a rotationally fixed manner. This mode of operation applies by analogy to the second back gear 13 as well. The latter is also designed as a spur gear set 34. It comprises a first spur gear 35, which is coupled to the gearbox input E or to the input 5 of the starting element 2 in a rotationally fixed manner and which meshes with a spur gear 36, which is coupled to the back-gear shaft 21 in a rotationally fixed manner and forms the output 15 of the back gear 13. Here, the back-gear shaft 21 is connected to the fourth back gear 19 via the synchronously shiftable coupling 17 and, in order to produce an additional gear step, alternatively to the third back gear 18. In an especially advantageous design for this embodiment, the gear-shifting device 3 is combined directly with the rpm/torque converting device 4 and, in this case, the back-gear shaft 21 is used in order to produce the gear steps in the back-gear design. Here, the individual intermeshing gearwheels for producing the gear steps are designed in the form of spur gear pairs, for which the intermeshing spur gears can each be connected to the gearbox output shaft A and to the back-gear shaft 21 in a rotationally fixed manner. The concrete choice of linkage of the individual spur gears can be made here at will. Preferably, these spur gears can be connected either to the gearbox output A via additional shiftable couplings 37 or 38 in a rotationally fixed manner or else [to][2] the other respective spur gear of a spur gear pair on the back-gear shaft 21 via the shiftable couplings. In the case depicted, the individual additional gear steps are produced by four back gears, which are designated here as 39 to 42 and are characterized by the spur gear sets 23 to 26. Here, the spur gears of the individual spur gear sets 23 to 26 either are arranged on the back-gear shaft 21 in a rotationally fixed manner or else are arranged on a shaft that is coupled to the gearbox output A in a rotationally fixed manner. In the case depicted, the shiftable coupling 37 is arranged coaxially to the starting element 2 and thus also coaxially to the gearbox input E and the gearbox output A and makes possible the selective rotationally fixed coupling of the spur gear set 23 or 24 to the gearbox output shaft A via the second power branch 11. The spur gear sets 41 and 42 can be connected via the additional shiftable coupling 38 to the back-gear shaft 21 and, on account of the rotationally fixed connection of the respective spur gears to the gearbox output A, a power transmission occurs from them. This arrangement is characterized by a simple construction.

[2][Translator's Note] Possible typographical error. The word in brackets is inferred.

The layout of the individual spur gear ratios in the individual back gears or spur gear steps is made for the rpm/torque-converting device according to the gear ratios in the individual gear steps that need to be set. The back-gear gear ratios are designed in such a way that, here, between the input E and the coupling to the rpm/torque converting devices, a gear ratio of <1 is produced. However, the concrete design lies in the discretion of the competent practitioner.

Provided according to an especially advantageous further development, furthermore, is a braking device 43, which is associated with the starting element 2, in particular with the output 6 of the starting element 2, and thus, in the case depicted, is responsible for holding the secondary wheel 30 in place. In this way, the gearbox output A can support itself via the corresponding gearing, in particular the gear-shifting device 3 and the coupling to the primary wheel or, in the case of direct through-coupling on account of the coupling to the gearbox input E, from the primary wheel coupled to it on the secondary wheel 30, which functions as a stator in this functional state.

Figure 2B:
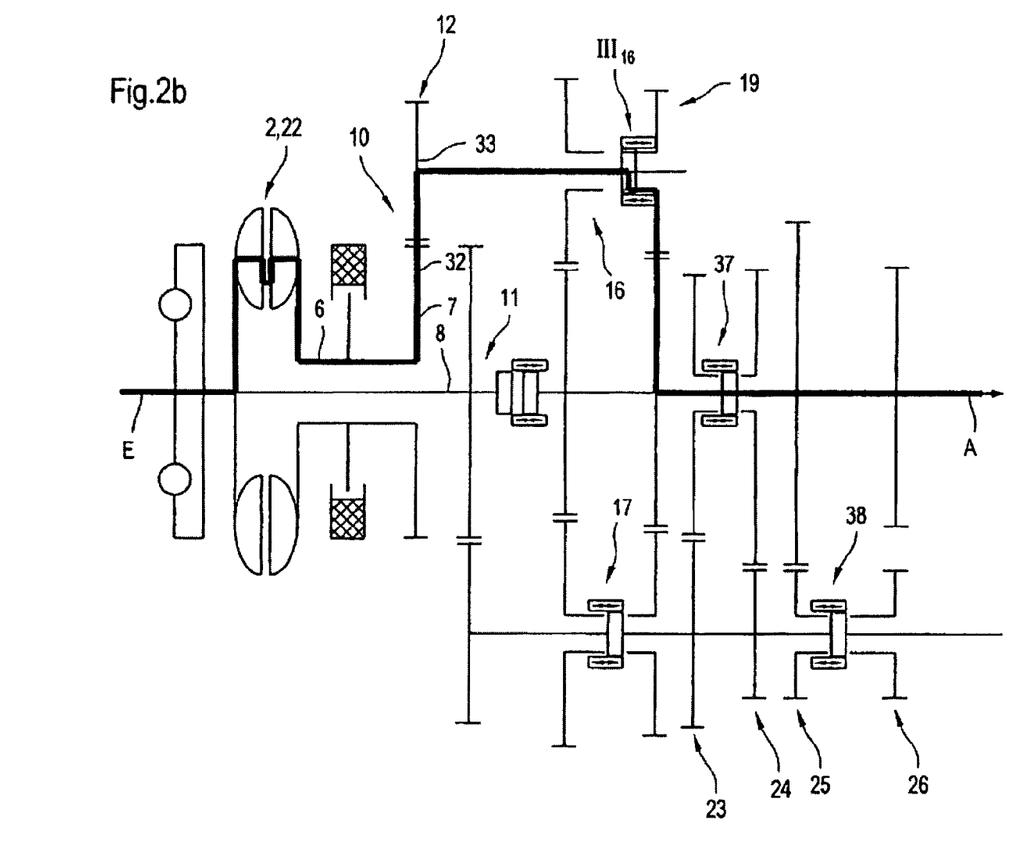

By way of example, FIG. 2b illustrates on the basis of the embodiment of the gearbox module 1, in particular the automatic gearbox according to FIG. 2a, the starting state. The power flow here is highlighted by a bold line. It is evident from this that, in this state, only the starting element 2, in the form of the hydrodynamic component 22, is active and that the power transmission occurs solely via the first power branch 10. The gear-shifting device 3 is characterized in this case by the switching position $III_{16}$ of the synchronously shiftable coupling 16. The first back gear 12 is thereby connected to one of the back gears—for example, to the fourth back gear 19, in a rotationally fixed manner. A connection via 18 would be equally conceivable. All other synchronously shiftable couplings 37, 38, as well as 27 and 17, are open in this functional state. The engagement of the lockup is depicted in the combined starting and switching state in FIG. 2c. It is evident from this that the power transmission occurs briefly via two power branches, the power branch 10 and the power branch 11, and that the switchover does not occur in black and white terms. In this case, the second back gear 13, in particular the back-gear shaft 21, will transmit via any spur gear set—for example, here, the spur gear set 25—onto the gearbox output A. To this end, the back-gear shaft 21 is coupled via the shiftable coupling 38 to the spur gear set 25 and thus to the back gear 41. Also conceivable here, depending on the desired gear step to be set, would be to actuate the synchronously shiftable coupling 17, in which case the back-gear shaft 21 would be connected via the fourth back gear to the gearbox output A.

Figure 2C:
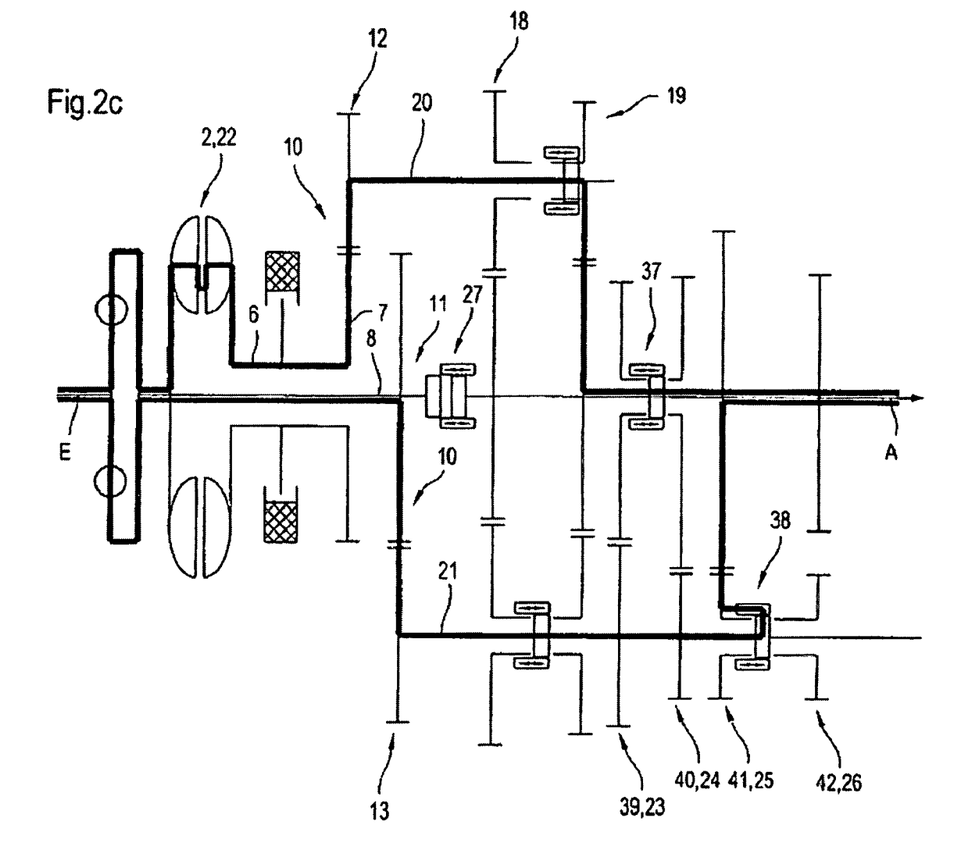

The power flows of the two power branches 10 and 11 are combined upstream of the output A. This occurs preferably at the output of the gear-shifting device 3.

Figure 2D:
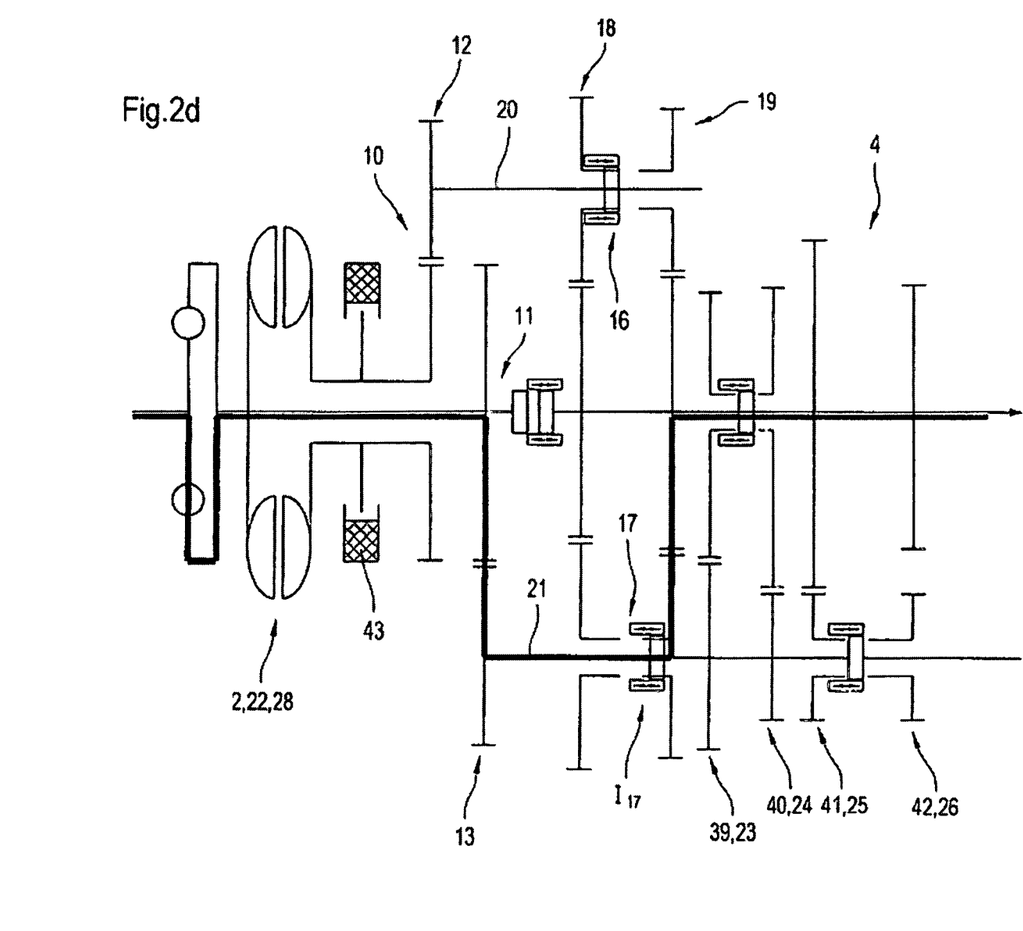

FIG. 2*d* illustrates by way of example a purely mechanical power transmission in a specific gear—for example, in a second gear step—which is characterized by the back gear 19. In this case, when the hydrodynamic clutch has been drained, either the synchronously shiftable coupling 16 is engaged with or coupled to a spur gear set that is not coupled to the back-gear shaft 21 or else, in the open state, that is, in the switching position $II_{16}$, the secondary wheel 30 is completely decoupled from the gearbox output A. The power transmission then occurs from the gearbox input E to the gearbox output A via the second power branch 11—here, by way of example, the fourth back gear 19—by activation of the synchronously shiftable coupling 17 and bringing the switching position Into switching position $I_{17}$, which is characterized by the rotationally fixed linkage of the third back gear 18 to the back-gear shaft 21. Other designs are equally conceivable. Thus, for example, the power flow for the individual gear steps can be realized by way of the selective activation of the synchronously shiftable couplings 17, 37, and 38, provided that no power flow occurs via the first power branch 10.

Figure 2E:
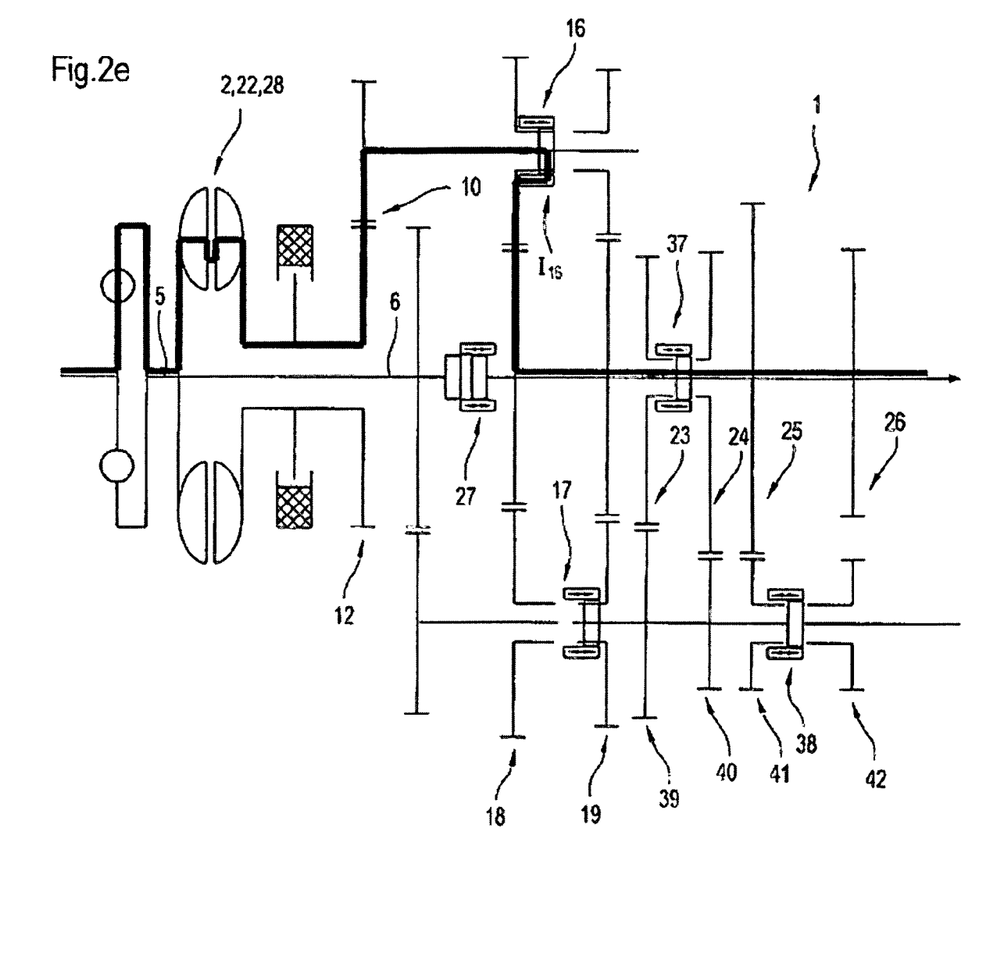
Figure 2F:
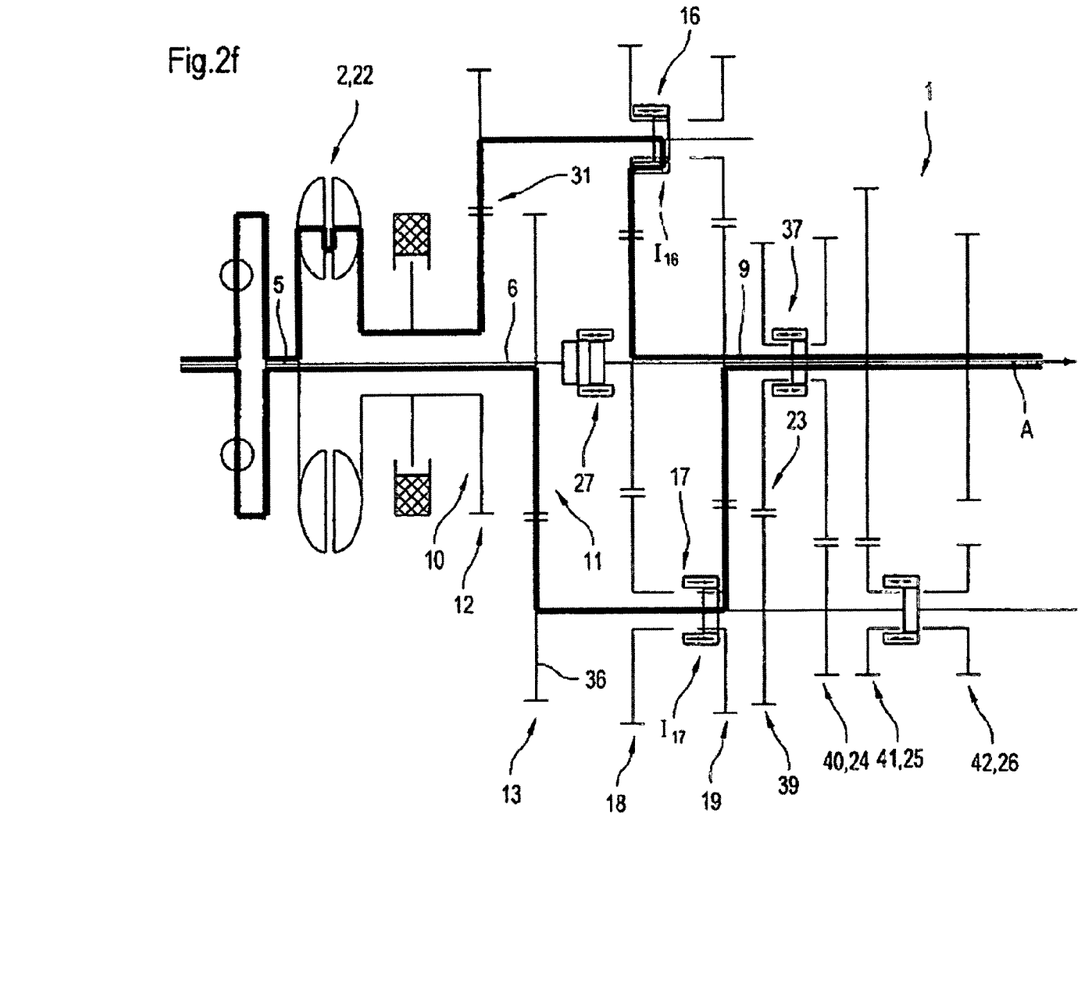

In order to maintain the power flow when any gear step is switched, the tractive power continues to be applied via the starting element 2 during the switching operation; that is, the power is then transmitted during the switching operation via the first power branch 10. This means that, for example, starting from the power transmission depicted in FIG. 2*d*, the starting element 2 is coupled again to the gearbox output A, for example, by shifting or actuating the synchronously shiftable coupling 16 and connecting the back-gear shaft 20 to the fourth back gear 18 and thus to the gearbox output A. This is depicted in FIG. 2*e*. At the end of the switching operation, the power flow is conveyed for a brief state again parallel by way of the hydrodynamic branch 10 and the purely mechanical branch 11, whereby, after the synchronously shiftable coupling 16 has been engaged, the running switching element—in the depicted case, the synchronously shiftable coupling 17—is opened. In this state, the power flow occurs, as stated, briefly via the starting element, that is, via the first power branch 10. After rpm equalization, the corresponding synchronously shiftable coupling for the gear step being engaged, the new switching element, which, in the depicted case, is formed by the shiftable coupling 17, is actuated and brought into its switching position, which, here, is the switching position $III_{17}$. In this case, the second back gear 13 is connected to the gearbox output A via the third back gear 18. If the synchronously shiftable coupling 17 is in its switching position $III_{17}$, the power flow in the first power branch 10 is interrupted.

Figure 2G:
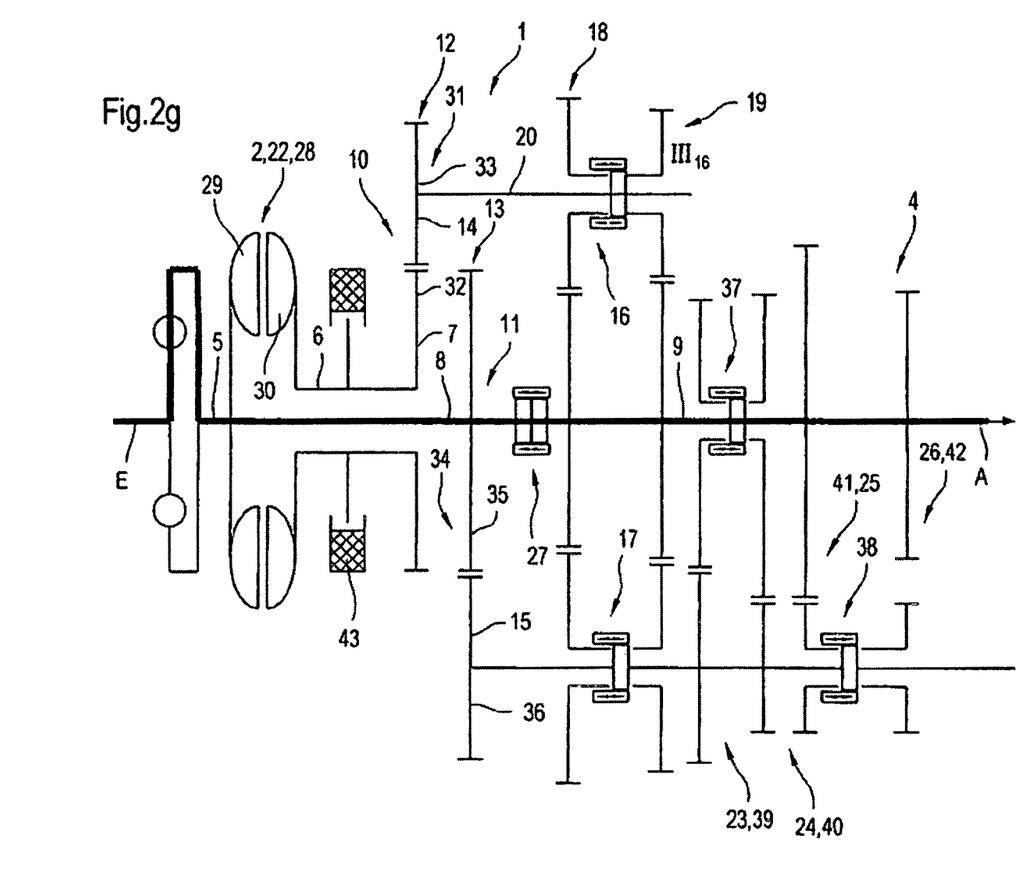

FIG. 2*g* illustrates, by contrast, the power transmission in direct gear. In this case, the synchronously shiftable coupling 27 is actuated. This occurs at the rpm equivalence between the gearbox input E and the gearbox output A. All other shiftable couplings are open.

In accordance with the invention, all coupling devices in the gearbox module 1 are designed as synchronously shiftable couplings, which preferably operate in a positive locking manner. Claw clutches find application here in an especially advantageous way. In terms of the couplings to be realized in the gear-shifting device 3 and in the rpm/torque converting devices 4, the gearbox module 1 is free of coupling elements that operate in a force-activated or frictionally engaged manner. This means that the mechanical power transmission always occurs free of slip.

Figure 3:
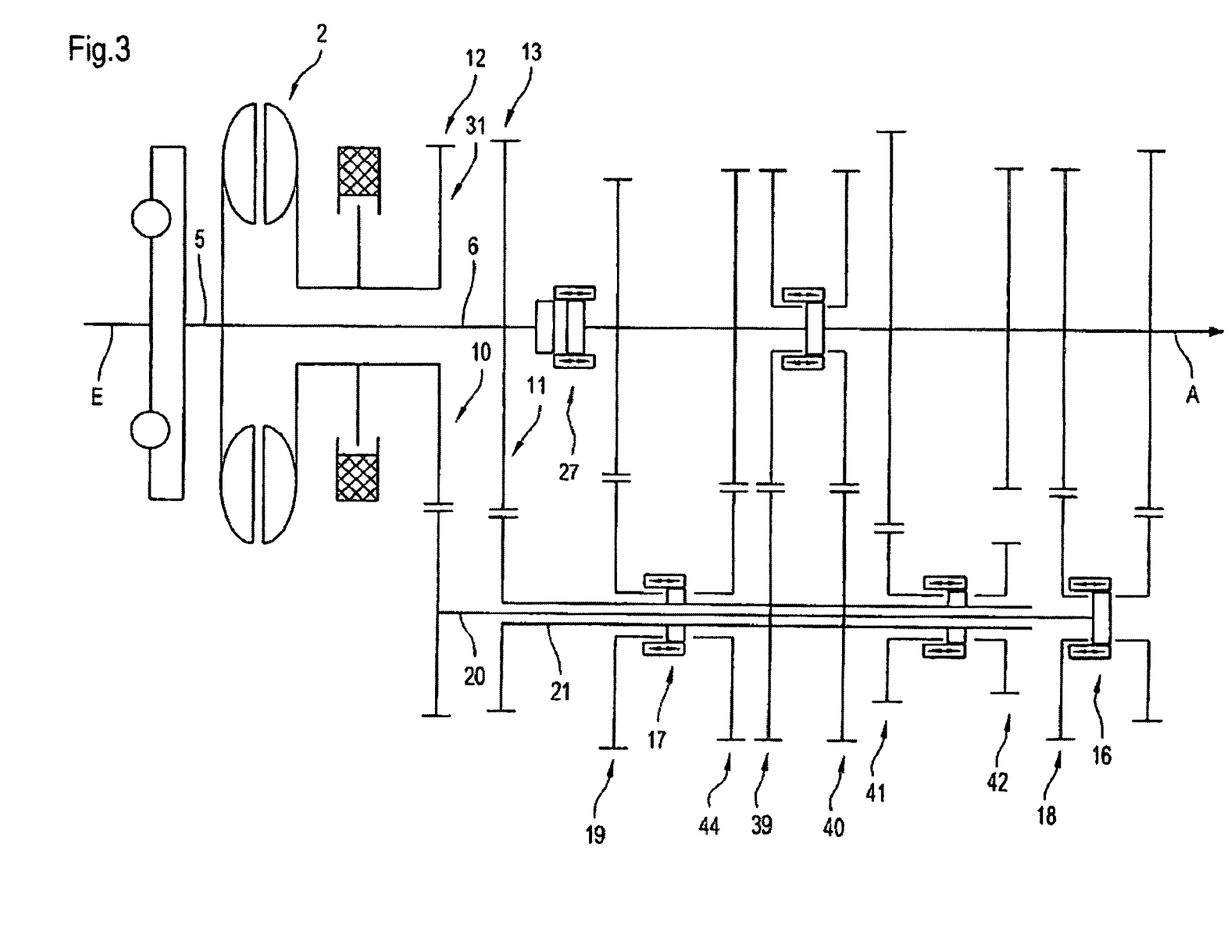
FIG. 3 illustrates a design that has back gears arranged coaxially to each other.

Illustrated in FIGS. 1 and 2 are embodiments with mutually parallel arrangements of the individual shiftable couplings 16 and 17 of the gear-shifting device 3; FIG. 3 shows an especially advantageous embodiment having a coaxial arrangement of these. To this end, one of the back-gear shafts 20 or 21 is designed as a hollow shaft. This depends each time on the arrangement of the back gears, the first back gear 12 and the second back gear 13, and the spatial arrangement of input 5 and output 6 of the starting element 2. In the case depicted, the back-gear shaft 21 of the second back gear 13 is designed as a hollow shaft 13, through which the back-gear shaft 20 of the first back gear 12 is passed. The two back gears are arranged coaxially and parallel to each other. The linkage of the first back gear to the gearbox output A occurs here via the third back gear 18, which, in this case, is arranged in the axial direction downstream from all of the back gears coupled to the hollow shaft. For this purpose, the back-gear shaft 20 is passed completely through the back-gear shaft 21, designed as a hollow shaft, and the shiftable coupling 16 is disposed in its spatial arrangement in the axial direction after the individual shiftable couplings as viewed in the axial direction. In this case, however, the back gear 18 that can be coupled to the shiftable coupling 16 cannot be used as the gear ratio for the mechanical gear, for which reason, in order to obtain an additional gear step and thus the same possible number of gears as in the solution according to FIG. 2, an additional back gear 44 is provided. This embodiment makes it possible to realize the same functional modes as in FIGS. 2*a* to 2*g*. However, this solution is characterized by a substantially more compact construction.

LIST OF REFERENCE NUMBERS

1 gearbox module
2 starting element
3 gear-shifting device
4 rpm/torque converting device
5 input of the starting element
6 output of the starting element
7 input of the gear-shifting device
8 input of the gear-shifting device
9 output of the gear-shifting device
10 first power branch
11 second power branch
12 first back gear
13 second back gear
14 output
15 output
16 synchronously shiftable coupling
17 synchronously shiftable coupling
18 additional third back gear
19 fourth back gear
20 back-gear shaft
21 back-gear shaft
22 hydrodynamic component
23 spur gear step
24 spur gear step
25 spur gear step
26 spur gear step
27 synchronously shiftable coupling
28 hydrodynamic clutch
29 primary wheel 30 secondary wheel
31 spur gear set
32 first element of the spur gear set
33 spur gear
34 spur gear
35 spur gear
36 spur gear
37 shiftable coupling
38 shiftable coupling
39 back gear
40 back gear
41 back gear
42 back gear
43 braking device
44 back gear
E gearbox input
A gearbox output

The invention claimed is:

1. A gearbox module comprising: a gearbox input and at least one gearbox output, a starting element coupled to the gearbox input and being hydrodynamic, the starting element having an input and an output that can be connected to the gearbox output; a gearshifting device comprising at least two inputs and one output connectable to the gearbox output; a first input of the gearshifting device connected to the output of the starting element and a second input of the gearshifting device connected to the input of the starting element; wherein each of the first and second inputs of the gearshifting device can be selectively connected via a synchronously shiftable coupling to the output of the gearshifting device to produce a first power branch and a second power branch, wherein the synchronously shiftable coupling enables power to flow via the power branches jointly in a closed state.

2. The gearbox module according to claim 1, wherein the gearshifting device is free of any power transmission subject to slip.

3. The gearbox module according to claim 1, wherein between the gearbox input in the direction of power flow outside of the power branch and the output of the gearshifting device is a synchronously shiftable coupling that enables a direct through-drive between the gearbox input and the gearbox output.

4. The gearbox module according to claim 1, wherein the hydrodynamic component is constructed as a hydrodynamic rpm/torque converter.

5. The gearbox module according to claim 1, wherein the output of the gearshifting device is connected via at least one rpm/torque converting device to the gearbox output in order to produce at least one gear step, wherein the at least one rpm/torque converting device comprises a plurality of shifting elements.

6. The gearbox module according to claim 5, wherein the gear ratios of the rpm/torque converting units arranged in the first and second power branches are substantially equal.

7. The gearbox module according to claim 5, wherein the gear ratios of the rpm/torque converting units arranged in the first and second power branches are different.

8. The gearbox module according to claim 5, wherein the rpm/torque converting device arranged after the gearshifting device is constructed in a back-gear design and is connected via the second back-gear shaft of the second power branch to the gearbox output with the formation of the output of the gearshifting device.

9. The gearbox module according to claim 5, wherein each one of the plurality of shifting elements of the rpm/torque converting device can be actuated for producing the individual gear steps and is designed as a synchronously shiftable coupling.

10. The gearbox module according to claim 9, wherein the synchronously shiftable coupling is designed as a positively locking clutch.

11. The gearbox module according to claim 9, wherein the synchronously shiftable coupling is a claw clutch.

12. The gearbox module according to claim 1, wherein the first and second power branches are arranged at least partially parallel to each other and, over a portion, parallel to the starting element.

13. The gearbox module according to claim 12, wherein the gearshifting device comprises two back gears, a first back gear that can be connected to the one output of the starting element in a rotationally fixed manner and a second back gear that can be connected to the input of the starting element in a rotationally fixed manner and that is free of any rotationally fixed coupling to the output of the starting element; the first back gear and the second back gear are each connected via at least one back-gear shaft to a back gear that is connected to the output of the gearshifting device in a rotationally fixed manner; the synchronously shiftable coupling of each of the first and second power branches is arranged at one of (a)-(c): (a) the connection of the first or second back gear to the output or the input of the starting element; (b) the coupling of the first or second back gear to the respective back-gear shaft; (c) the coupling of the first or second back gear, connected to the output, to the respective back-gear shaft; the coupling of the back gear connected to the one output.

14. The gearbox module according to claim 13, wherein the back gear of the respective first or second power branches coupled to the one output of the gearshifting device can also be brought into connection with the back-gear shaft of the other first or second power branches.

15. The gearbox module according to claim 13, wherein the individual back gears are designed as spur gear steps.

16. The gearbox module according to claim 13, wherein in the axial direction as viewed between the gearbox input and the gearbox output, the two back gears coupled to the output are spatially disposed behind the first and second back gears and the synchronously shiftable couplings associated with the first and second power branches each serve for connecting the two back gears, connected to the output, to the back-gear shaft.

17. The gearbox module according to claim 13, wherein the first and second back gears are arranged coaxially and parallel to each other in the axial direction.

18. The gearbox module according to claim 17, wherein the back-gear shaft of one of the first and second power branches is a hollow shaft, through which the back-gear shaft of the other of the first and second power branches is passed.

19. The gearbox module according to claim 18, wherein two shiftable couplings of the first and second power branches are arranged coaxially to each other and each serve to connect the back-gear shafts to the back gear that can be coupled to the output of the gearshifting device.

20. The gearbox module according to claim 18, wherein in the axial direction, the second back gear is arranged behind the first back gear and the back gears of each of the first and second power branches that can be coupled to the output of the gearshifting device are arranged after the first and second back gears.

21. The gearbox module according to claim 1, wherein the hydrodynamic component is designed as a hydrodynamic clutch comprising a primary wheel and a secondary wheel, which is free of a guide wheel.

22. The gearbox module according to claim 21, further comprising a braking device is operably connected with the output of the starting element and serves for holding in place the secondary wheel and makes possible a support of the primary wheel.

* * * * *